United States Patent [19]
Scheckenbach et al.

[11] Patent Number: 6,005,037
[45] Date of Patent: Dec. 21, 1999

[54] MOLDING MATERIAL FOR PROCESSING SINTERABLE POLYMERS

[75] Inventors: Helmut Scheckenbach, Langen; Andreas Schleicher, Beselich; Michael Bayer, Langweid, all of Germany

[73] Assignee: Hoechst AG, Germany

[21] Appl. No.: 08/550,389

[22] Filed: Oct. 27, 1995

[30] Foreign Application Priority Data

Oct. 31, 1994 [DE] Germany .............................. 44 38 962

[51] Int. Cl.$^6$ ...................................... C08L 91/06
[52] U.S. Cl. ......................... 524/278; 524/275; 524/277; 524/279; 524/379; 524/386; 524/388; 524/487; 524/563
[58] Field of Search ..................... 524/487, 563, 524/277, 278, 279, 275, 379, 386, 388

[56] References Cited

U.S. PATENT DOCUMENTS

| | | | |
|---|---|---|---|
| 3,822,227 | 7/1974 | Hermann et al. | 524/279 |
| 3,872,040 | 3/1975 | Mollohan et al. | 524/277 |
| 4,076,667 | 2/1978 | Fontanel et al. | 524/277 |
| 4,108,939 | 8/1978 | Anderson et al. | 264/129 |
| 4,235,761 | 11/1980 | Koenig | 524/277 |
| 4,237,037 | 12/1980 | Takahashi et al. | 524/277 |
| 4,255,322 | 3/1981 | Kopchik | 524/178 |
| 4,265,794 | 5/1981 | Pett et al. | 524/277 |
| 4,822,837 | 4/1989 | Van Der Meer | 524/279 |
| 4,873,276 | 10/1989 | Fuji et al. | 524/279 |
| 4,891,399 | 1/1990 | Ohkawa et al. | 524/440 |
| 5,086,105 | 2/1992 | Abe et al. | 524/492 |
| 5,164,436 | 11/1992 | Maier et al. | 524/277 |
| 5,223,562 | 6/1993 | Sagawa et al. | 524/277 |
| 5,254,613 | 10/1993 | Bayer et al. | 524/277 |
| 5,278,251 | 1/1994 | Ohtani et al. | 524/504 |
| 5,304,422 | 4/1994 | Tanabe et al. | 524/520 |
| 5,346,737 | 9/1994 | Takahashi et al. | 524/268 |
| 5,356,971 | 10/1994 | Sagawa et al. | 524/277 |
| 5,417,756 | 5/1995 | Bayer et al. | 524/277 |
| 5,496,917 | 3/1996 | Fleischer et al. | 528/373 |

FOREIGN PATENT DOCUMENTS

| | | | |
|---|---|---|---|
| 164767 | 10/1985 | European Pat. Off. | 524/279 |
| 0 459 229 | 12/1991 | European Pat. Off. . | |
| 32845 | 2/1985 | Japan | 524/279 |
| 362070087 | 3/1987 | Japan | 524/279 |
| 19549 | 4/1988 | Japan | 524/278 |
| 1307110 | 12/1989 | Japan | 524/279 |
| 5271708 | 10/1993 | Japan . | |
| 60 16935 | 1/1994 | Japan . | |

*Primary Examiner*—Judy M. Reddick
*Attorney, Agent, or Firm*—Connolly & Hutz

[57] ABSTRACT

A molding material which contains a sinterable polymer and a wax as a binder and advantageously an ethylene/vinyl acetate copolymer, an organic peroxide, an azoester and an alcohol can be injection molded to give a molding, dewaxed without loss of dimensional stability of the molding and then sintered.

18 Claims, No Drawings

MOLDING MATERIAL FOR PROCESSING SINTERABLE POLYMERS

The invention relates to a polymer molding material which contains a sinterable polymer and a wax-based thermoplastic binder and is used for the production of sintered polymer moldings.

The use of phenolic compounds for the preparation of polyphenylene sulfide-containing sintered moldings is known (cf. U.S. Pat. No. 4,108,939). Phenolic compounds are mixed with a polypenylene sulfide powder in order to obtain a moldable material. The molded material is heat-cured in a state prior to sintering, a polyphenylene sulfide material containing phenol resin being formed. The moldable material cannot be processed by injection molding or extrusion since thermal treatment leads to hardening.

It is the object of the invention to provide a process for the production of shaped sintered articles, sinterable polymers being capable of being processed by thermoplastic shaping methods as a result of the addition of a suitable binder.

It has been found that the use of a wax-based thermoplastic, organic binder system permits the processing of sinterable polymers with the aid of thermoplastic shaping methods, such as injection molding and extrusion.

The invention thus relates to a molding material which contains at least one sinterable polymer and a wax-based thermoplastic binder.

The invention also relates to a process for the production of sintered moldings, which comprises producing a shaped article from a molding material which contains at least one sinterable polymer and a wax-based thermoplastic binder, by injection molding extrusion or pressing, which shaped article is subjected to a sintering process.

The invention furthermore relates to a sintered molding produced from a molding material which contains a sinterable polymer and a thermoplastic binder.

The novel molding material contains a sinterable polymer in powder form. The powders have the property of forming, under the action of heat at the points of contact of the particles, initially bridges and subsequently necks, which change into a continuous microstructure with a continuing action of heat. This process takes place either without melt formation or in a gel state and is generally associated with a decrease in volume.

The sintering temperature is chosen so that the sintering temperature is below the melting point or the decomposition point of the sinterable polymer.

The sinterable polymer is mixed as fine-particled powder with the thermoplastic binder. A molding is produced by injection molding, extrusion or pressing. The molding is then densified in a heat treatment. The resulting moldings can then be brought to their final shape with the aid of machining methods, if necessary.

Sinterable polymers are polymers with a sufficiently high melting point which permits sintering. In general, polymers having a melting point of at least 200° C., preferably of at least 240° C. and particularly preferably of at least 260° C. are suitable as a sinterable polymer. Such polymers occur, for example, in the following polymer classes: fluoropolymers (such as polytetrafluorcethylene (PTFE), tetrafluoroethylene/ethylene copolymers (ETFE), polytrifluorochloroethylene (PCTFE), trifluorochloroethylene/ethylene copolymers (ECTFE), perfluoroalkoxy (PFA)), polyaryl ether ketone (PEK), polyarylene sulfone (PSU), polyaryl ether sulfones (PES), polyarylene sulfide (PAS), polyimide (PI), polyamidoimides (PAI), polyetherimides (PEI), polyesterimides, polyhydantoins, polycycloenes, liquid crystalline polymers (LCP) and oxidized or partially oxidized polyarylensulfide. The polymers polyoxadiazobenimidazole, polybenzimidazole (PBI) and polyimidazopyrolone (Pyrone), are also suitable.

Polyarylene sulfides, which are also referred to as polyarylene thioethers, are polymers which contain at least one arylene sulfide unit (—A—S—; A=arylene radical, S=sulfur). Arylenes are, for example, phenylene, biphenylene (—$C_6H_4$—$C_6H_4$—), naphthalene, anthracene or phenanthrene, which may be monosubstituted or polysubstituted. Substituents are, for example, straight-chain, cyclic or branched $C_1$–$C_{20}$-hydrocarbon radicals, such as $C_1$–$C_{10}$-alkyl radicals, e.g. methyl, ethyl, n-propyl, isopropyl, n-butyl, tert-butyl or n-hexyl, or $C_6$–$C_{14}$-aryl radicals, e.g. phenyl or naphthyl; halogens, sulfo, amino, nitro, cyano, hydroxyl or carboxyl groups.

Polyarylene sulfoxides are polymers which contain at least one arylene sulfoxide unit (—Ar—SO—; Ar=arylene radical, SO=sulfoxide group).

Polyarylene sulfides, in particular polyphenylene sulfide, can be prepared on the basis of the reaction of dihalogenated aromatics with sodium sulfide according to EDMONDS and HILL. Polyarylene sulfides and their preparation are described in "Ullmann's Encyclopedia of Industrial Chemistiy, Volume A21, B. Elvers, S. Hawkins and G. Schulz (Eds.), VCH, Weinheim-New York 1992, pages 463–472), to which reference is made. The synthesis of sulfo-containing polyarylene sulfides is described in Chimia 28(9), (1974), 567, to which reference is likewise made.

Polyarylene sulfoxides can also be obtained by oxidation of polyarylene sulfides. The preparation of polyarylene sulfoxides can be carried out, for example, by oxidation with ozone, as described in German Patent Application No. P 43 14 736.4 filed on May 4, 1993, and having the title "Oxidation of Polyarylene sulfides", to which reference is made here.

The oxidation of polyarylene sulfides can be carried out by suitable oxidation procedures so that only some of the sulfide bridges are converted into sulfoxide groups (incomplete oxidation, for example by using substoichiometric amounts of oxidizing agent). Such oxidation products are also included under the term polyarylene sulfoxide. The oxidation conditions can also be adapted (temperature, ozone concentration) so that sulfonyl bridges are also formed in addition to sulfoxide bridges.

Polyarylene sulfones and polysulfones are polymers which contain at least one arylene sulfone unit (—A—$SO_2$; A: arylene radical, $SO_2$: sulfonyl group). Polyarylene sulfones can be prepared for example by oxidation of polyarylene sulfides by means of hydrogen peroxide or peracid. The preparation of polyarylene sulfones is described, for example, in DE 43 14 737 A1 and DE 43 14 738 A1, to which reference is made.

Polysulfones are described in "Encyclopedia are polymer science and engineering, Volume 13, Wiley, N.Y. 1988, pages 196–211, keyword 'polysulfones'", to which reference is made here.

In addition to the pure polymers, mixtures or blends of sinterable polymers may be used. Mixtures or blends of polyarylene sulfones ($PASO_2$) with polyarylene sulfoxides (PASO) and/or polyarylene sulfides (PAS) have proven advantageous. Combinations are e.g. $PASO_2$/PASO, $PASO_2$/PAS, PASO/PAS, $PASO_2$/PASO/PAS, which are useful as sinterable polymer.

Particularly advantageous sinterable polymers are mixtures or blends which comprise the following components:

(A) at least one polyarylene sulfone in an amount of from 33 to 99% by weight, (B) at least one polyarylene sulfoxide in an amount from 1 to 67% by weight, preferably from 5 to 50% by weight, in particular from 10 to 40% by weight, and/or (C) at least one polyarylene sulfide in an amount from 1 to 67% by weight, preferably from 1 to 40% by weight, in particular from 1 to 25% by weight, where the sum of the components (A), (B) and/or (C) is always 100% by weight.

Instead of a mixture or blend which comprises a polyarylene sulfone, polyarylene sulfoxide and/or polyarylene sulfide, it is also possible to use a partially oxidized polyarylene sulfide which also contains arylene sulfoxide and/or arylene sulfone units in addition to the arylene sulfide units. Partially oxidized polyarylene sulfides and their preparation are described, for example, in DE 43 14 737 A1, to which reference is made here.

As a sinterable polymer, an oxidized or partially oxidized polyarylene sulfide can also be mixed with the components A, B and/or C.

Suitable polyarylene sulfides, polyarylene sulfoxides, polyarylene sulfones and partially oxidized polyarylene sulfides have, for example, an average molecular weight $M_w$ from 4000 to 400,000, preferably from 10,000 to 150,000, in particular from 25,000 to 100,000. The molecular weights of the soluble polymers are generally determined by gel permeation chromatography (GPC).

The mean particle size $D_{50}$ of the sinterable polymers is in general in the range from $0.5 \times 10^{-6}$ to $500 \times 10^{-6}$ m, preferably from $0.5 \times 10^{-6}$ to $300 \times 10^{-6}$ m and particularly preferably from $0.5 \times 10^{-6}$ to $200 \times 10^{-6}$ m.

The molding material may contain reinforcing substances, such as carbon fibers, mineral fibers (e.g. glass fiber), metal, ceramic materials, glass, polymers or fluorinated polymers (e.g. PTFE) or conventional fillers, in addition to the sinterable polymers. The substances may be present in an amount of up to 90% by weight of the sintered material, advantageously up to 60% by weight and particularly advantageously up to 30% by weight.

The molding material contains waxes in addition to the sinterable polymer. These waxes are natural waxes, fully synthetic or semisynthetic waxes, polyolefin waxes or amide waxes. Preferred waxes are semisynthetic waxes based on crude montan wax and polyolefin waxes.

Preferred semisynthetic waxes based on crude montan wax have the following characteristics:

| | | |
|---|---|---|
| Drop point | 79 | to 90° C. |
| Acid number | 5 | to 35 mg KOH/g |
| Saponification number | 70 | to 160 mg KOH/g |
| Density | 0.97 | to 1.03 g/cm³ |
| Viscosity | 20 | to 80 mPa.s at 100° C. |

Preferred polyolefin waxes have the following characteristics:

| | | |
|---|---|---|
| Drop point | 102 | to 158° C. |
| Acid number | 0 | to 64 mg KOH/g |
| Saponification number | 0 | to 115 mg KOH/g |
| Density | 0.87 | to 1.03 g/cm³ |
| Viscosity | 100 | to 1500 mPa.s at 170° C. |

The semisynthetic waxes based on crude montan wax are formed in general by oxidative bleaching of crude montan wax and esterification of the resulting acid wax with a $C_2$- to $C_8$-diol. Waxes of this type have been commercially available for many years.

Polyolefin waxes are formed, for example, by mass polymerization in the Ziegler low-pressure process. These polyolefin waxes can be converted into oxidation products by treating the melt with air. These waxes, too, have been commercially available for many years.

The addition of ethylene/vinyl acetate copolymers (EVA copolymers) to the thermoplastic binder, for example an ethylene/vinyl acetate copolymer having a melt flow index according to ASTM D 1238 of from 0.2 to 440 g/10 min, preferably from 0.2 to 168 g/10 min, a vinyl acetate content of from 11 to 42%, preferably from 11 to 28%, and a Vicat softening temperature according to ASTM D 790 of from 36 to 80° C., preferable from 74 to 79° C., is advantageous. Ethylene/vinyl acetate copolymers are commercially available.

The addition of peroxide to the thermoplastic binder is also advantageous if the wax is to be crosslinked. The use of an organic peroxide which has a scorch temperature of at least 100° C. is particularly advantageous. Suitable organic peroxides are, for example, 1,1-di(tert-butylperoxi) trimethylcyclohexane, n-butyl di(tert-butyl-peroxi)valerate, dicumyl peroxide, tert-butyl cumyl peroxide, 1,3-di(tert-butylperoxiisopropyl)benzene and 3,3,6,6,9,9-hexamethyl-1,2,4,5-tetraoxacyclononane, preferably 2,5-dimethyl-2,5-di (tert-butylperoxi)hexane.

The addition of an alcohol having a molecular weight of at least 300 to the thermoplastic binder is also advantageous. The alcohol may be present either in solid or in liquid form. The alcohols to be used are insoluble in the other components of the molding material and are prepared, for example, by polymerization of alkylene oxide. Such alcohols, for example glycol polyethers, are soluble in water, ethanol, isopropanol or acetone to a concentration of at least 40% and can be removed completely from the molding by means of a thermal method. Primary, secondary or tertiary and also monohydric, dihydric or trihydric alcohols may be used. The boiling point of the alcohols to be used is in general above 150° C.

A free radical initiator is also advantageously added to the thermoplastic binder. A free radical initiator is, for example, an azoester, preferably 2,2-azobis(2-acetoxypropane).

The thermoplastic binder should have a melting point of at least 40° C. and a melt viscosity of at least 10 mPa.s.

The molding material has, for example, the following composition:

| | | |
|---|---|---|
| Sinterable polymer powder | from 60 to 80, | preferably from 65 to 75, parts by weight |
| Semisynthetic wax | from 1 to 10, | preferably from 1.5 to 6, parts by weight |
| Polyolefin wax | from 2 to 10, | preferably from 3 to 6, parts by weight |
| EVA copolymer | from 1 to 10, | preferably from 1.5 to 3, parts by weight |
| Organic peroxide | from 0.01 to 0.05, | preferably from 0.02 to 0.04, part by weight |
| Azoester | from 0.01 to 0.05, | preferably from 0.02 to 0.04, part by weight |
| Alcohol | from 1 to 10, | preferably from 1.5 to 6, parts by weight. |

The molding material particularly preferably has the following composition:

from 60 to 80 parts by weight of a sinterable polymer,
from 1 to 10 parts by weight of a semisynthetic wax based on crude montan wax having a drop point of from 79 to 90° C., an acid number of from 5 to 35 mg KOH/g, a saponification number of from 70 to 160 mg KOH/g, a density of from 0.97 to 1.03 g/cm$^3$, and a viscosity of from 20 to 80 mPa.s at 100° C., from 2 to 10 parts by weight of a polyolefin wax having a drop point of from 102 to 158° C., an acid number of from 0 to 64 mg KOH/g, a saponification number of from 0 to 115 mg KOH/g, a density of from 0.87 to 1.03 g/cm$^3$ and a viscosity of from 100 to 1500 mPa.s at 170° C., from 1 to 10 parts by weight of an EVA copolymer having a melt flow index according to ASTM D 1238 of from 0.2 to 440 g/10 min, a vinyl acetate content of from 11 to 42% and a Vicat softening temperature according to ASTM D 790 of from 36 to 80° C., from 0.01 to 0.05 part by weight of an organic peroxide having a scorch temperature of at least 100° C., from 0.01 to 0.05 part by weight of an azoester and from 1 to 10 parts by weight of an alcohol.

The preparation and processing of the novel molding material which contains a sinterable polymer having a melting point above 240° C. is described by way of example below:

1. Thermoplastic Binder

For the preparation of the thermoplastic binder, the semi-synthetic wax based on crude montan wax and the polyolefin wax are melted at a temperature of about 150° C. in a suitable stirred vessel and processed to a homogeneous melt. The ethylene/vinyl acetate copolymer and the alcohol are then added to the melt while stirring. The mixture is stirred at about 150° C. until complete dissolution of all components in the melt. Finally, the organic peroxide and the azoester are carefully added while stirring.

2. Preparation of the Injection Molding Material

The organic binder is melted in a heatable kneader. The sinterable polymer powder is kneaded, at a temperature of about 150° C., into the melt present in the kneader. Alternatively, the binder in an aqueous dispersion can be mixed with the powder at room temperature. After removal of the water by drying, the polymer particles are coated with binder. The kneaded thermoplastic material is comminuted to free-flowing granules, preferably by extrusion, and the molding material is processed in an injection molding machine to give a molding. The shaped molding in the cold state is distinguished by grip strength, which ensures non-destructive flash removal and mechanical processability.

3. Removal of the Binder, 1st Stage

The molding obtained is stored for from 2 to 6 hours in water or solvent maintained at about 50° C. The alcohol is dissolved out of the molding. The completeness of the dewaxing can be monitored with the aid of a dye dissolved in the alcohol.

4. Increase in Dimensional Stability

The molding is initially heated in an oven to 170 to 200° C., preferably 180 to 190° C., at a heating rate of 20° C./min and is kept at this temperature for a period of from 0.1 to 1 hour. During this procedure, the viscosity of the organic binder is increased by free radical cross-linking of the EVA component, due to cleavage of the organic peroxide, in such a way that deformation of the molding due to a reduction in viscosity caused by a further temperature increase is ruled out. As a result of this measure, the shape of the molding is maintained over the entire duration of the subsequent dewaxing and sintering process.

5. Removal of the Binder, 2nd Stage

The removal of the binder remaining in the molding from the molding is carried out in the temperature range from 200 to 400° C. in an atmosphere enriched with oxygen. At a temperature above 220° C., the wax components, in particular those which contain polypropylene, undergo free radical degradation owing to cleavage of the organic peroxide. In the absence of oxygen which occurs inside the molding in spite of an oxygen-containing gas atmosphere outside the molding, the components of the binder which contains polyethylene (i.e. also the EVA copolymer) undergo free radical degradation in a temperature range between 300 and 350° C. after cleavage of the azoester. The degradation products are readily oxidizable by the oxygen-enriched oven atmosphere from the outer region of the molding to the interior. This is supported by the pore system which is obtained by the wet extraction and permits gas flow within the molding. After completion of the dewaxing, the oven atmosphere is changed over to inert gas, depending on the powder raw material. Only after this step has been carried out can the dewaxed molding be brought to sinter temperature.

6. Sinter Process

The molding is heated to a temperature at which sintering occurs. In the process described above, an injection molding having a wall thickness of from 6 to 10 mm is dewaxed and sintered in the course of 10 hours without distortion.

In the process described above, the addition of ethylene/vinyl acetate copolymer to the binder in step 1 is optional, but its addition is very advantageous. It is also possible to dispense with the addition of the azoester in step 1 and with steps 3 and 5 if the binder is not to be removed from the molding.

The use of a binder system which can be dewaxed in a plurality of stages has advantages as regards the duration of the process. Extraction with solvent or water is suitable for the removal of at least one component. The aqueous solution of the binder component, which solution is obtained from the extraction, is not water-polluting. The dewaxing of the molding is accelerated by the radical degradation of the organic binder above the shaping temperature. A molding material for injection molding which also contains an ethylene/vinyl acetate copolymer, an organic peroxide, an azoester and an alcohol in addition to a wax can be readily injection molded and can be dewaxed without loss of dimensional stability of the molding.

Sintered moldings produced from a molding material according to the invention have fine pores and are suitable for the filtration of liquids and gases. Further applications are bearings and gaskets.

The following abbreviations are used in the examples below:

| | |
|---|---|
| DSC | Differential scanning calorimetry |
| $T_g$ | Glass transition temperature |
| $T_m$ | Melting point |
| DP | Drop point |
| AN | Acid number |
| SN | Saponification number |
| HZ | Heating zone |
| PPS | Polyarylene sulfide |
| PPSO | Polyarylene sulfoxide |
| PPSO$_2$ | Polyarylene sulfone |

EXAMPLE 1

The product described below was used as a polyphenylene sulfone. 833 g of polyphenylene sulfide powder ($M_w$ 40,000) having a mean particle diameter of 20×10$^{-5}$ m were suspended in 2.9 dm$^3$ of glacial acetic acid at 55° C., 16 cm$^3$ of concentrated sulfuric acid were added and 616 g of hydrogen peroxide (87% strength) were added dropwise while maintaining a constant temperature. After stirring had been carried out for 3 hours at from 58 to 65° C., the reaction suspension was cooled and the solid was filtered off with suction at 50° C., washed with water and dried.

Yield: 998 g (93%).

DSC data: $T_G$: 352° C.; Tm: 520° C. (decomposition)

Elemental analysis:

Calculated C 51.42%, H 2.88%, O 22.83%, S 22.87%,

Found C 51.39%, H 2.93%, O 22.81%, S 22.86%.

0.6 part by weight of an ester wax based on crude montan wax (DP from 79 to 85° C., AN from 15 to 20, SN from 130 to 160, density from 1.01 to 1.03 g/cm³, viscosity about 30 mPa.s/100° C.) was melted with 1.2 parts by weight of polyolefin wax (DP 158° C., AN O, SN O, density from 0.87 to 0.89 g/cm³, viscosity 1500 mPa.s/170° C.), 1.2 parts by weight cf ethylene/vinyl acetate copolymer (melt flow index from 0.2 to 0.4 g/10 min, VA content from 11 to 13%, Vicat softening temperature 79° C.) and an alcohol (molecular weight 20,000 g/mol, viscosity 13,000 mPa.s at 20° C., density 1.1 g/cm³) at 150° C. in a stirred vessel and were processed to give a homogeneous melt. 0.02 part by weight each of 2,2-azobis(2-acetoxypropane) and of an organic peroxide (scorch temperature about 160° C.) was stirred into this melt. 12 parts by weight of the polyphenylene sulfone powder described above and having an average particle diameter $D_{50}$ of 20 μm were then kneaded into the melt at 150° C. The thermoplastic molding material was converted on an injection molding machine (type KMO90/210B, Kraus-Maffei, Munich, Germany) to annular moldings having a diameter of 50 mm and a wall thickness of 4 mm using the following process parameters: cylinder temperatures: heating zone (HZ) 1 130° C., HZ 2 135° C., HZ 3 140° C., HZ 4 145° C., HZ 5 150° C., nozzle temperature 150° C., mold temperature 30° C.

The molding was then stored for 5 hours in water maintained at about 70° C. About 40% by weight of the binder was dissolved out of the molding. The partially dewaxed molding was brought from room temperature to 330° C. in air with a temperature increase of 1° C./min. The remaining binder content was thermally crosslinked in the temperature range from 170 to 180° C. in order to prevent deformation of the molding due to softening. Above 200° C., the remaining binder content was removed thermally with free radical degradation. The molding was then sintered at 360° C. The molding obtained was crack-free.

EXAMPLE 2

The procedure was as in Example 1, except that a mixture of 90% of PPSO$_2$ and 10% of PPS was used instead of the PPSO$_2$. The PPS used was ®Fortron 0205 B4 from Hoechst AG, having an average particle size $D_{50}$ of 20 μm. The polyphenylene sulfone used was the product described in Example 1. The moldings obtained had higher mechanical strengths compared with Example 1.

EXAMPLE 3

The procedure was as in Example 1, except that a mixture of 75% of PPSO$_2$ and 25% of PPSO was used instead of the PPSO$_2$. The PPSO was prepared as described in the German patent application DE 43 14 736, having an average particle size $D_{50}$ of 20 μm. The polyphenylene sulfone used was the product described in Example 1. The moldings obtained had higher mechanical strengths compared with Example 2.

We claim:

1. A molding material comprising
   a) a sinterable polymer which is an organic polymer having a melting point above 240° C. and is in the form of a powder and said organic polymer is selected from the group consisting of polytetrafluoroethylene (PTFE), tetrafluoroethylene/ethylene copolymers (ETFE), polytrifluorochloroethylene (PCTFE), trifluorochloroethylene/ethylene copolymers (ECTFE), perfluoroalkoxy (PFA), polyaryl ether ketone (PEK), polyarylene sulfone (PSU), polyaryl ether sulfones (PES), polyarylene sulfide (PAS), polyimide (PI), polyamidoimides (PAI), polyetherimides (PEI), polyesterimides, polyhydantoins, polycycloenes, liquid crystalline polymers (LCP), oxidized or partially oxidized polyarylensulfide, polybenzimidazole (PBI) and polyimidazopyrolone (Pyrone) and
   b) a thermoplastic binder containing a wax component and at least one further component selected from the group consisting of inorganic peroxide, organic peroxide, free radical initiator and alcohol.

2. The molding material as claimed in claim 1, wherein the thermoplastic binder comprises a semisynthetic wax, a polyolefin wax or a crude montan wax.

3. The molding material as claimed in claim 1, wherein the thermoplastic binder comprises an ethylene/vinyl acetate copolymer.

4. The molding material as claimed in claim 1, wherein the thermoplastic binder contains an inorganic or organic peroxide.

5. The molding material as claimed in claim 1, wherein the thermoplastic binder contains an azoester.

6. The molding material as claimed in claim 1, wherein the thermoplastic binder contains an alcohol.

7. The molding material as claimed in claim 1, wherein the molding material further comprises a metal, a ceramic material, glass, fillers, carbon fibers, mineral fibers or a fluorinated polymer.

8. The molding material as claimed in claim 1, wherein the sinterable polymer is an organic polymer having a melting point of least 260° C.

9. The molding material as claimed in claim 1, wherein the sinterable polymer has a mean particle size, $D_{50}$, from $0.5 \times 10^{-6}$ to $500 \times 10^{-6}$ m.

10. The molding material as claimed in claim 9, wherein the mean particle size, $D_{50}$, from $0.5 \times 10^{-6}$ to $200 \times 10^{-6}$ m.

11. The molding material as claimed in claim 10, wherein said molding material consists essentially of a sinterable polymer powder from 60 to 80 parts by weight, a semisynthetic wax from 1 to 10 parts by weight, a polyolefin wax from 2 to 10 parts by weight, an EVA copolymer from 1 to 10 parts by weight, an organic peroxide from 0.01 to 0.05 parts by weight, an azoester from 0.01 to 0.05 parts by weight, and alcohol from 1 to 10 parts by weight.

12. The molding material as claimed in claim 11, wherein said molding material consists essentially of a sinterable polymer powder from 65 to 75 parts by weight, a semisynthetic wax from 1.5 to 6 parts by weight, a polyolefin wax from 3 to 6 parts by weight, an EVA copolymer from 1.5 to 3 parts by weight, an organic peroxide from 0.02 to 0.04 parts by weight, an azoester from 0.02 to 0.04 parts by weight, and alcohol from 1.5 to 6 parts by weight.

13. The molding material as claimed in claim 12, wherein said semisynthetic wax is based on crude montan wax having a drop point of from 79 to 90° C. and an acid number of from 5 to 35 mg KOH/g, a saponification number of from 70 to 160 mg KOH/g, intensity of from 0.97 to 1.03 g/cm³ and a viscosity of from 20 to 80 mPa.s at a 100° C.; said polyolefin wax has a drop point of from 102 to 158° C., an acid number of from 0 to 64 mg KOH/g, a saponification number of from 0 to 115 mg KOH/g, a density of from 0.87 to 1.03 g/cm³ and a viscosity of from 100 to 1500 mPa.s at 170° C.; said EVA said copolymer has a melt flow index according to ASTM D 1238 of from 0.2 to 440 g/10 min, a vinyl acetate content of from 11 to 42% and a vicat softening temperature according to ASTM D 790 of from 36 to 80° C., and said organic peroxide has a scorch temperature of at least 100° C.

14. The molding material as claimed in claim 1, wherein said molding material further comprises reinforcing substances present in an amount up to 60% by weight based on the weight of the total molding composition.

15. The molding material as claimed in claim 14, wherein said reinforcing substances are in an amount up to 30% by weight based on the total molding composition.

16. The molding material as claimed in claim 11, wherein said reinforcing substances are present in an amount up to 30% by weight based on the total molding composition.

17. The molding material as claimed in claim 15, wherein said reinforcing substances are present in the molding material and are selected from the group consisting of carbon fibers, mineral fibers, metal, ceramic materials, glass, polymers and fillers.

18. The molding material as claimed in claim 1, wherein said sinterable polymer is a polyarylene sulfone, polyarylene sulfoxide or a polyarylene sulfide or a combination thereof.

* * * * *